United States Patent
McAnally

[11] 3,712,328
[45] Jan. 23, 1973

[54] TIRE VALVE CORE

[75] Inventor: Milton Beasley McAnally, Nashville, Tenn.

[73] Assignee: Scovill Manufacturing Company, Waterbury, Conn.

[22] Filed: Aug. 5, 1971

[21] Appl. No.: 169,235

[52] U.S. Cl..................137/234.5, 137/543.19, 251/368
[51] Int. Cl............................................F16k 15/20
[58] Field of Search.......137/234.5, 543.19; 251/368

[56] References Cited

UNITED STATES PATENTS

| | | | |
|---|---|---|---|
| 3,000,390 | 9/1961 | Hosking | 137/234.5 |
| 3,433,389 | 3/1969 | Puster | 137/234.5 X |
| 3,561,467 | 2/1971 | Lutz | 137/234.5 |

*Primary Examiner*—Harold W. Weakley
*Attorney*—Dallett Hoopes

[57] ABSTRACT

Tire valve core has drawn metal shell with ridges on either side of plastic shell gasket and grooves aligned with edges of gasket to receive plastic flow and anchor gasket securely.

6 Claims, 3 Drawing Figures

PATENTED JAN 23 1973

3,712,328

INVENTOR.
Milton B McAnally
BY Hallett Hoopes
ATTORNEY

TIRE VALVE CORE

This invention relates to a tire valve core. More specifically, the invention relates to a core having a drawn sheet metal shell surrounded by resilient plastic sealing means.

The prior art contains a number of disclosures of cores which are adapted to be screwed into tire valve stems. These cores invariably have a metal body surrounded by a rubber or plastic sealing element and contain valve means in the form of a pin disposed axially of the core operable from the top thereof to unseat a plug at the bottom of the body.

Especially effective sealing means surrounding the shell is disclosed in the U.S. Pat. No. 2,932,531 to Briechle. In that patent, the sealing means comprised a polytetrafluoroethylene (PTFE) gasket surrounding the body and fitting into a groove therearound. PTFE and closely related plastics have the advantage in such usage that they will not stick but instead easily come away from their engagement against the shoulder of the stem when the core is removed.

In the Briechle core, the need for positive anchoring of the slippery PTFE gasket is recognized by the provision on the plug of sharp indentations forming radial shoulders adapted to hold the ends of the gasket. This structure has been regarded as essential to counteract the tendency of the slippery PTFE to, in removal of the core, simply slide off the end of the body.

The need for sharp corners and radial shoulders on a core body to hold the PTFE gasket has led to the impression in the past that core bodies for use with PTFE or other self-lubricating plastics had to be machined from solid stock. Thus, even though tubular structures could be inexpensively drawn from sheet material, the inability to provide shoulders on such drawn shapes has, in the past, led manufacturers to think that machining operations on solid stock were necessary.

Under the present invention, a simple but ingenious configuration of a drawn body makes its use compatible with the use of a PTFE or similar plastic gasket material. There is thus provided a less expensive core featuring an effective seal with the valve stem and at the same time assuring an integrity of assembly comparable to that of earlier machined core bodies surrounded by PTFE seals.

Other objects of the invention will be apparent from the following specification including the drawings wherein there is disclosed a preferred but non-limiting example of structure embodying the invention.

Figure 1:
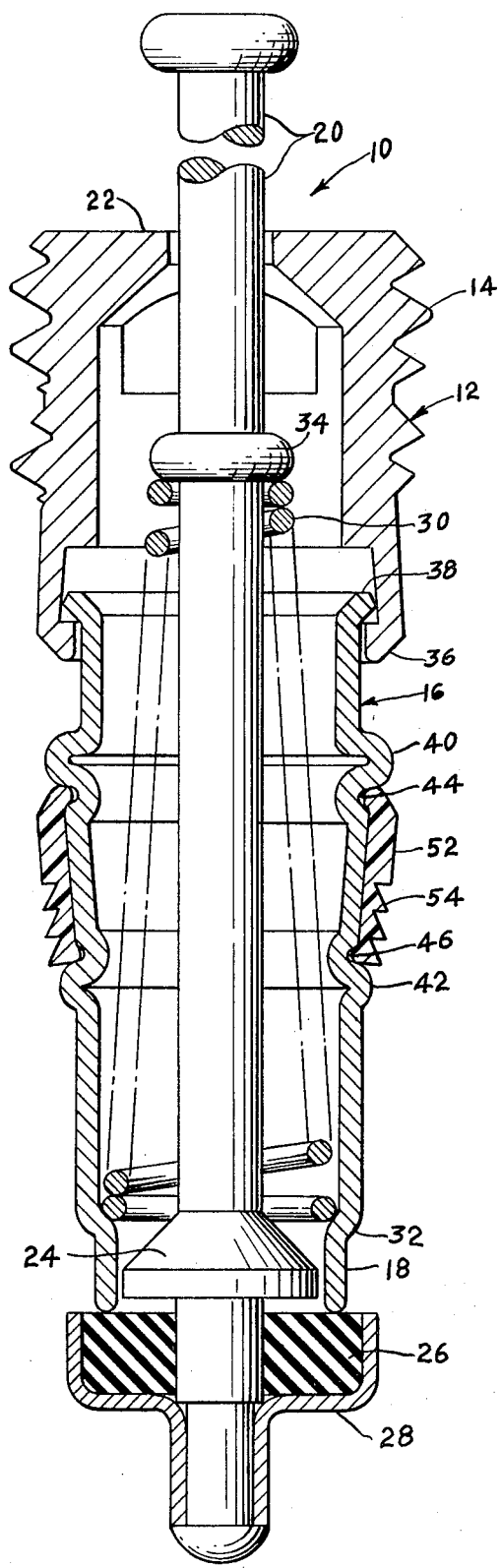
FIG. 1 is a sectional view of a core embodying the invention.
Figure 2:
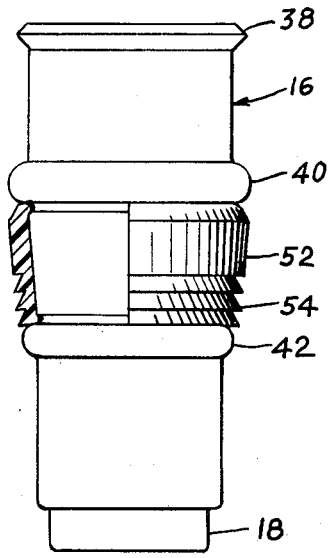
FIG. 2 is a plan elevation, having the gasket partly stripped away, of a drawn body part.

Referring more specifically to the drawings, a core embodying the invention is generally designated 10 in FIG. 1. It comprises a core body 12 including a machined head 14 and a drawn sheet metal shell 16. The lower end of the shell presses a seat 18. A valve pin 20 is supported at its upper end in a conventional bridge 22 and centered at its lower end by a conical centering flange 24. A sealing washer 26 is supported in a valve head 28 mounted on the bottom end of the pin 20.

A helical closing spring 30 surrounds the pin 20 and is disposed between an upwardly facing shoulder 32 formed in the shell and a stop shoulder 34 on the pin as is conventional.

As shown in FIG. 1, the lower end of the head 14 presents a bottom opening which is surrounded by an inward lip 36. The upper end of the shell 16 is formed with a flared mouth 38 and in assembly, as is conventional, the bottom opening is closed so that the lips 36 enclose the flared mouth 38 and hold the shell and head together.

Figure 3:
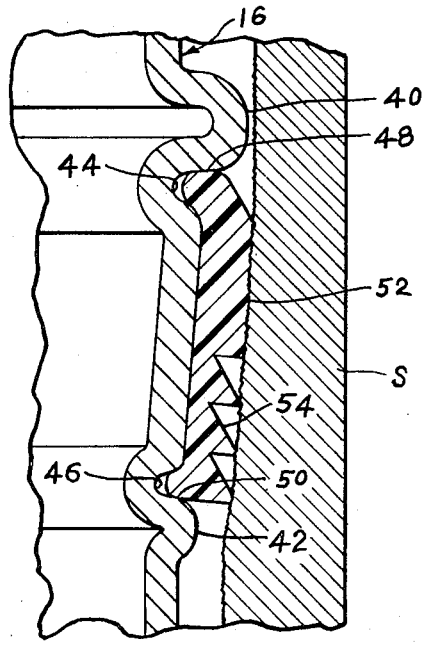
FIG. 3 is a greatly enlarged sectional view showing the assembly of the gasket and the plug engaging the shoulder of the valve stem.

Attention is now directed to the shape of the shell intermediate its ends. As shown, the shell is formed with a pair of spaced peripheral ridges 40 and 42. Intermediate the ridges, a pair of peripheral grooves 44 and 46 are formed in the shell. As shown, the grooves are disposed respectively adjacent the beads 40 and 42 on the side of the respective bead which is more proximate the other bead. There is thus formed in the shell a substantial wall or shoulder intermediate each rib and groove, as at 48 and 50 (FIG. 3). The area of the shell intermediate the grooves may be barrel shaped, but preferably is frusto-conical in shape.

As shown, a PTFE gasket or seal 52 comprising a continuous circumferential band is disposed about the shell between the ridges 40 and 42. Preferably, the lower portion of the gasket presents a sawtoothed profile as at 54 in accordance with aforementioned Briechle patent.

In assembly, the PTFE gasket 52, which may be a short section from an extruded tube and sized smaller than the area of the shell it is to surround, is slipped up over the end of the shell so that its margins align with grooves 44 and 46. The gasket, retaining its memory, will in these areas, flow, shrink into, and closely hug into the inward grooves 44 and 46 respectively. Under compression against the sidewall of the tire valve stem S additional plastic will flow into the grooves. This inward disposition of the plastic effectively anchors the gasket on the shell and makes these two pieces virtually unitary.

Experience has shown that some sort of grooves 44 and 46 or depressions adjacent the ridges 40 and 42 are necessary and essential to the invention to provide an anchor for the gasket. It is similarly necessary that the diameter of the shell at some point intermediate the grooves be substantially larger than the diameter at the grooves.

It will be seen that there is presented a new valve core especially useful as a tire valve, but not necessarily limited thereto, having a drawn shell which effectively holds gaskets of PTFE and the like and which by virtue of having been drawn is much less expensive to produce than earlier machined versions. The shell is useful in a "short" core, but may also be used in a "long" core. The success of the new shell is attributable to the configuration described although variations from the specific embodiment shown will be possible under the invention within the following claim language:

I claim:

1. In a tire valve core comprising a two-piece core body including a machined head and a shell, the machined head being exteriorly threaded and having a bottom opening with an inward lip thereabout, the upper end of the shell having an outward flare, the lip at the lower end of the head being crimped inward to enclose the flare and hold the shell, a gasket of self-lubricating plastic snugly surrounding the shell, and valve means disposed in the body; the improvement wherein the shell is of drawn sheet metal and is formed with a pair of spaced peripheral beads and a pair of spaced peripheral inward grooves disposed respectively adjacent the beads on the side of the respective bead which is more proximate the other bead and wherein the plastic gasket is a continuous band with the margins of the band flowing into and closely hugging into the inward grooves respectively.

2. A tire valve core as described in claim 1 wherein the plastic of the gasket is a fluoride-containing polymer.

3. A tire valve core as described in claim 2 wherein the plastic of the gasket is polytetrafluoroethylene.

4. A tire valve core as described in claim 1 wherein the exterior surface of the gasket is of saw-toothed profile.

5. A tire valve core as described in claim 1 wherein the shell, between the lowermost depths of the two grooves presents a smooth frusto-conical shape.

6. In a valve core comprising a two-piece core body including a machined head and a shell, the machined head being exteriorly threaded and having a bottom opening with an inward lip thereabout, the upper end of the shell having an outward flare, the lip at the lower end of the head being crimped inward to enclose the flare and hold the shell, a gasket of self-lubricating plastic snugly surrounding the shell, and valve means disposed in the body; the improvement wherein the shell is of drawn sheet metal and is formed with at least one peripheral bead and a peripheral inward groove disposed adjacent the bead and wherein the plastic gasket is a continuous band with a margin of the band butting against the bead and flowing into and closely hugging into the inward groove.

* * * * *